United States Patent
Fume et al.

(10) Patent No.: US 10,606,875 B2
(45) Date of Patent: Mar. 31, 2020

(54) SEARCH SUPPORT APPARATUS AND METHOD

(71) Applicant: KABUSHIKI KAISHA TOSHIBA, Minato-ku, Tokyo (JP)

(72) Inventors: Kosei Fume, Kawasaki Kanagawa (JP); Masayuki Okamoto, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 241 days.

(21) Appl. No.: 14/847,961

(22) Filed: Sep. 8, 2015

(65) Prior Publication Data

US 2016/0078025 A1 Mar. 17, 2016

(30) Foreign Application Priority Data

Sep. 16, 2014 (JP) .................................. 2014-188230

(51) Int. Cl.
*G06F 16/338* (2019.01)
*G06F 16/951* (2019.01)

(52) U.S. Cl.
CPC .......... *G06F 16/338* (2019.01); *G06F 16/951* (2019.01)

(58) Field of Classification Search
CPC ............... G06F 17/3002; G06F 17/241; G06F 17/2247; G06F 3/0486; G06F 16/338
See application file for complete search history.

(56) References Cited

U.S. PATENT DOCUMENTS

| 5,933,822 | A | 8/1999 | Braden-Harder et al. |
| 7,464,074 | B2 | 12/2008 | Sebbane |
| 8,402,365 | B2 | 3/2013 | Suzuki et al. |

(Continued)

FOREIGN PATENT DOCUMENTS

| JP | 2003-178075 A | 6/2003 |
| JP | 2004-038263 A | 2/2004 |

(Continued)

OTHER PUBLICATIONS

Mine, S., et al., "Smart Scrapbooking System Based on User Search Behavior for Sightseeing Information Aggregation", DEIM Forum, May 3, 2014, p. 4-3, 15 pgs.

*Primary Examiner* — Mariela Reyes
*Assistant Examiner* — Courtney Harmon
(74) *Attorney, Agent, or Firm* — Knobbe, Martens, Olson & Bear, LLP (57) ABSTRACT

According to one embodiment, a search support apparatus includes a first analyzer, a first acquirer, a measurement unit, a first extractor, a second extractor and a storage. The first analyzer analyzes a clipped document. The first acquirer acquires an updated document by referring to the location information if an original document has been updated. The measurement unit measures a first update frequency of the original document. The first extractor extracts one or more first keywords from the clipped document. The second extractor extracts one or more second keywords from the updated document using a first keyword extraction scheme set in accordance with the first update frequency. The storage stores the one or more first keywords, the one or more second keywords and the update document each associated with the clipped document.

18 Claims, 7 Drawing Sheets

| | 601 High-frequency update pattern | 602 Periodic update pattern | 603 No-update pattern |
|---|---|---|---|
| Algorithm | New word extraction | Unknown word detection | Named entity extraction |
| Attribution in document | Price:1.2 | Value:1.5 | Title:1.5 |
| Parameter | W:0.3,L=0 | W:1.9,L=0 | W:1.0,L=1 |

(604 braces the three lower rows)

(56) References Cited

U.S. PATENT DOCUMENTS

| | | |
|---|---|---|
| 8,812,504 B2 | 8/2014 | Kokubu et al. |
| 8,977,620 B1 | 3/2015 | Buryak et al. |
| 9,002,848 B1 | 4/2015 | Peng et al. |
| 2004/0024739 A1 | 2/2004 | Copperman et al. |
| 2004/0054666 A1 | 3/2004 | Lapir et al. |
| 2006/0053142 A1 | 3/2006 | Sebbane |
| 2007/0005589 A1 | 1/2007 | Gollapudi |
| 2008/0140643 A1 | 6/2008 | Ismalon |
| 2008/0148147 A1 | 6/2008 | Poston et al. |
| 2008/0221987 A1* | 9/2008 | Sundaresan ............ G06Q 30/02 705/14.54 |
| 2009/0307213 A1 | 12/2009 | Deng et al. |
| 2009/0327243 A1 | 12/2009 | Pradhan et al. |
| 2010/0169305 A1* | 7/2010 | Patterson ............ G06F 17/2288 707/728 |
| 2011/0035403 A1 | 2/2011 | Ismalon |
| 2012/0078907 A1 | 3/2012 | Kokubu et al. |
| 2013/0263018 A1* | 10/2013 | Xiong ................. H04N 21/458 715/753 |
| 2013/0318063 A1* | 11/2013 | Ayzenshtat ........... G06F 16/951 707/707 |
| 2015/0088491 A1 | 3/2015 | Fume et al. |

FOREIGN PATENT DOCUMENTS

| | | |
|---|---|---|
| JP | 2006-065754 A | 3/2006 |
| JP | 2006-164256 | 6/2006 |
| JP | 2007-133688 A | 5/2007 |
| JP | 2007-233438 | 9/2007 |
| JP | 2010-079915 | 4/2010 |
| JP | 2010-176387 A | 8/2010 |
| JP | 2011-170418 A | 9/2011 |
| JP | 2012-073804 A | 4/2012 |
| JP | 2013-016106 | 1/2013 |
| JP | 2013-069175 | 4/2013 |
| JP | 2015-060581 | 3/2015 |
| WO | WO 99/14690 A1 | 3/1999 |

* cited by examiner

| Document ID | Time of clipping | Time of last update (Time of last acquiring documents) | Link information | Document body | Original keywords | Extended keywords |
|---|---|---|---|---|---|---|
| 001 | 2014-01-23 13:32:13 | 2014-02-22 15:13:40 | http://www.aaa.co.jp http://www.bbb.co.jp | \<HTML... | Energy saving, gas | Energy-saving support fair, Smart-UPS |
| 002 | 2014-01-23 15:11:49 | 2014-01-31 09:13:25 | http://ccc.ne.jp http://ddd.net | \<HTML... | Environment, energy saving | |
| 003 | 2014-01-23 18:53:54 | 2014-02-01 12:53:29 | http://eee.co.jp http://fff.jp | \<HTML... | Power generation, solar power generation | Ventilation request, ERP-123 |

SEARCH SUPPORT APPARATUS AND METHOD

CROSS-REFERENCE TO RELATED APPLICATIONS

This application is based upon and claims the benefit of priority from Japanese Patent Application No. 2014-188230, filed Sep. 16, 2014, the entire contents of which are incorporated herein by reference.

FIELD

Embodiments described herein relate generally to a search support apparatus and method.

BACKGROUND

Through the spread of the Internet, the increase in the variety of devices, such as personal computers, smart phones, tablet devices, etc., and the commoditization of these devices, information can be easily acquired from Web documents. Thus, a procedure and an application for "clipping" electronic documents such as Web documents, similar to the clipping of paper media such as newspapers and magazines, have been realized. Through the spread of smart phones and tablet devices in particular, it is easy to select and move sentences in a document to make clippings.

When searching accumulated clippings for a document relevant to a related document, if the relevant document is shown to a user by a system, pages are usually displayed as thumbnails due to a limited display space. However, it is difficult to ascertain the contents of the relevant document only from a thumbnail display. Thus, in order to help a user to understand an outline of the relevant document, there are techniques of presenting property information, such as a date of creation and a date of clipping, and tag information explicitly given by a user. There is also a technique of presenting a relevant document based on keywords that co-occur between collected clippings.

DETAILED DESCRIPTION

With the above-described technique, a relevant document is only presented based on extracted co-occurring keywords. Even if keywords co-occurring between clippings are presented, the keyword may not be always useful for a user to determine the relevancy between clippings.

In general, according to one embodiment, a search support apparatus includes a first analyzer, a first acquirer, a measurement unit, a first extractor, a second extractor and a storage. The first analyzer analyzes a clipped document to obtain location information indicating a location of an original document which is an origination from which the clipped document is obtained. The first acquirer acquires an updated document by referring to the location information if the original document has been updated, the updated document being the updated original document. The measurement unit measures a first update frequency of the original document. The first extractor extracts one or more first keywords from the clipped document. The second extractor extracts one or more second keywords from the updated document using a first keyword extraction scheme which is set in accordance with the first update frequency. The storage stores the one or more first keywords, the one or more second keywords and the update document each associated with the clipped document.

Hereinafter, the search support apparatus, method, and program according to the present embodiment will be described in detail with reference to the drawings. In the following embodiments, the elements which perform the same operation will be assigned the same reference symbol, and redundant explanations will be omitted as appropriate.

Figure 1:
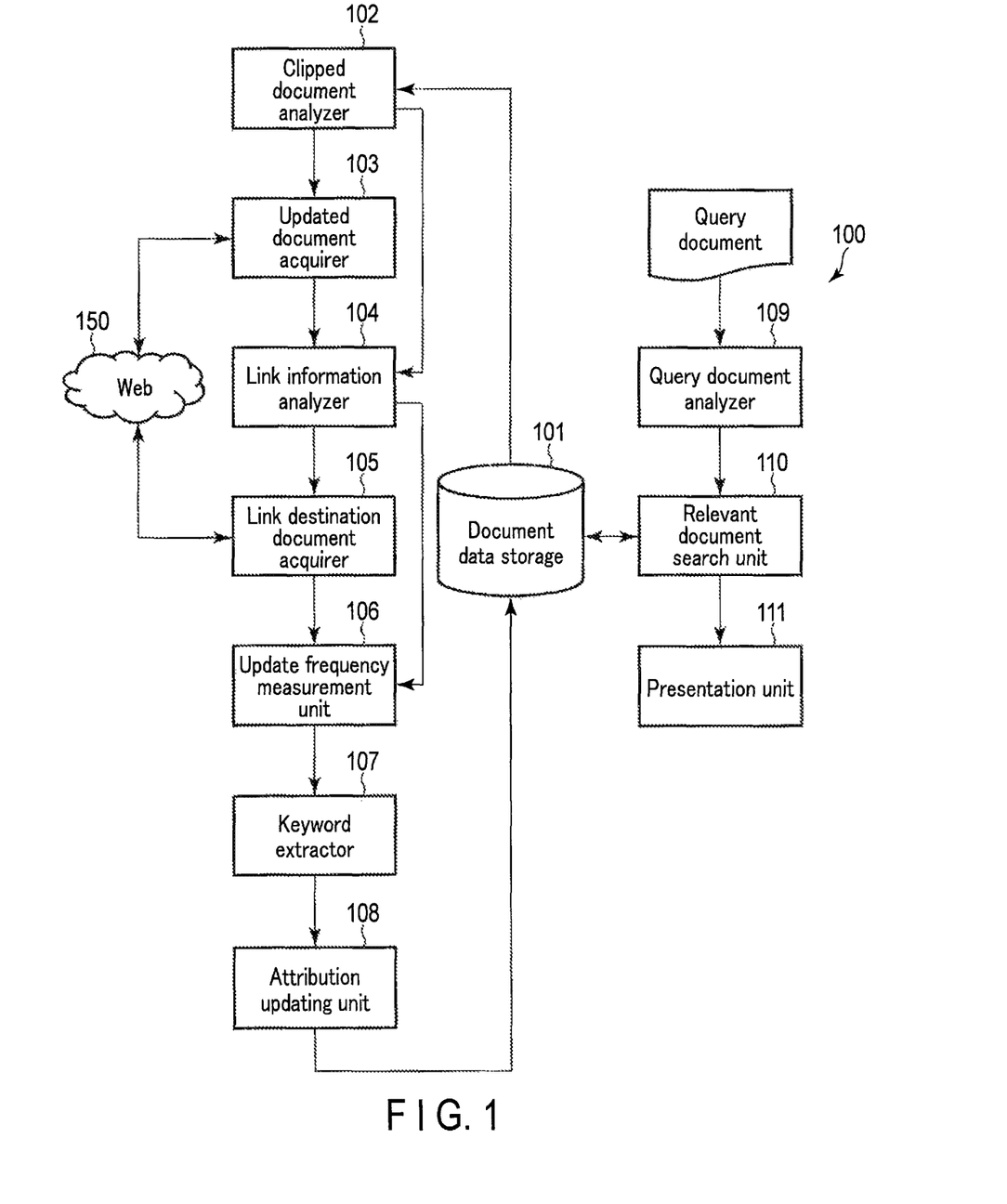
FIG. 1 is a block diagram illustrating a search support apparatus according to the present embodiment.

The search support apparatus according to the present embodiment will be explained with reference to the block diagram shown in FIG. 1.

The search support apparatus 100 includes a document data storage 101, a clipped document analyzer 102, an updated document acquirer 103, a link information analyzer 104, a link-destination document acquirer 105, an update frequency measurement unit 106, a keyword extractor 107, an attribution updating unit 108, a query document analyzer 109, a relevant document search unit 110, and a presentation unit 111.

The document data storage 101 accumulates document data of one or more clipped documents, A clipped document is all or a part of an electronic document, and is a clipped (cut) area of the document selected by a user. For example, if a document is displayed on a touch-screen-type display, a user can designate an area with a pen or their fingers, and the designated area is generated as a clipped document. A clipped document may also be generated by making annotations on a document, such as underlining, highlighting, or marking a first line, and so on. The document data storage 101 will be described later with reference to FIG. 3.

The clipped document analyzer 102 receives the clipped document from the document data storage 101, and analyzes the clipped document to obtain location information indicating a location of the original document which is the origination from which the clipped document is obtained. Uniform resource locator (URL) and Internet protocol (IP) addresses are used as location information, for example.

The updated document acquirer 103 receives the location information of the original document from the clipped document analyzer 102, searches Web 150 while referring to the location information, and determines whether or not the original document has been updated since the clipped document stored in the document data storage 101 was obtained. If the original document has been updated, an updated document, which is the updated original document, is obtained.

The link information analyzer 104 receives the clipped document from the clipped document analyzer 102 and the updated document from the updated document acquirer 103, and analyzes the clipped document and the original document to obtain link information included in each of the clipped document and the updated document. The link information is information indicating links to other documents in the document, such as a hyperlink.

The link destination document acquirer 105 receives link information from the link information analyzer 104, and searches Web 150 for a link destination document which is a linked-to document.

The update frequency measurement unit 106 receives the clipped document and the updated document from the link information analyzer 104, and receives the link destination document from the link destination document acquirer 105, and measures the frequency of updating the original document and the frequency of updating the link destination document.

The keyword extractor 107 receives the clipped document, the updated document, and the link destination document from the update frequency measurement unit 106. The keyword extractor 107 extracts one or more keywords from the clipped document, and extracts one or more keywords from the updated document and the link destination document, using a keyword extraction scheme in accordance with the frequency of updating. The keyword extraction scheme indicates what criteria and algorithms are used to extract keywords. The details of the keyword extractor 107 will be described later with reference to FIG. 5.

The attribution updating unit 108 receives the clipped document, the updated document, the link destination document, and one or more keywords from the keyword extractor 107, and performs an updating process on the document data of the clipped document stored in the document data storage 101 by associating one or more keywords with each of the updated document and the link destination document.

The query document analyzer 109 obtains a query document which serves as a search query, and obtains a word feature amount by analyzing the query document. As a query document, a clipped document designated by a user, or a new document input by a user may be determined as a query document.

The relevant document search unit 110 receives the query document and the word feature amount from the query document analyzer 109, and searches the document data storage 101 for a clipped document having a level of similarity with the word feature amount of the query document being higher than a threshold to obtain the searched clipped document as a relevant document.

The presentation unit 111 is, for example, a display. It receives and presents the query document, the relevant document, and the updated document, the link destination document, and the keywords associated with the relevant document.

Figure 2:
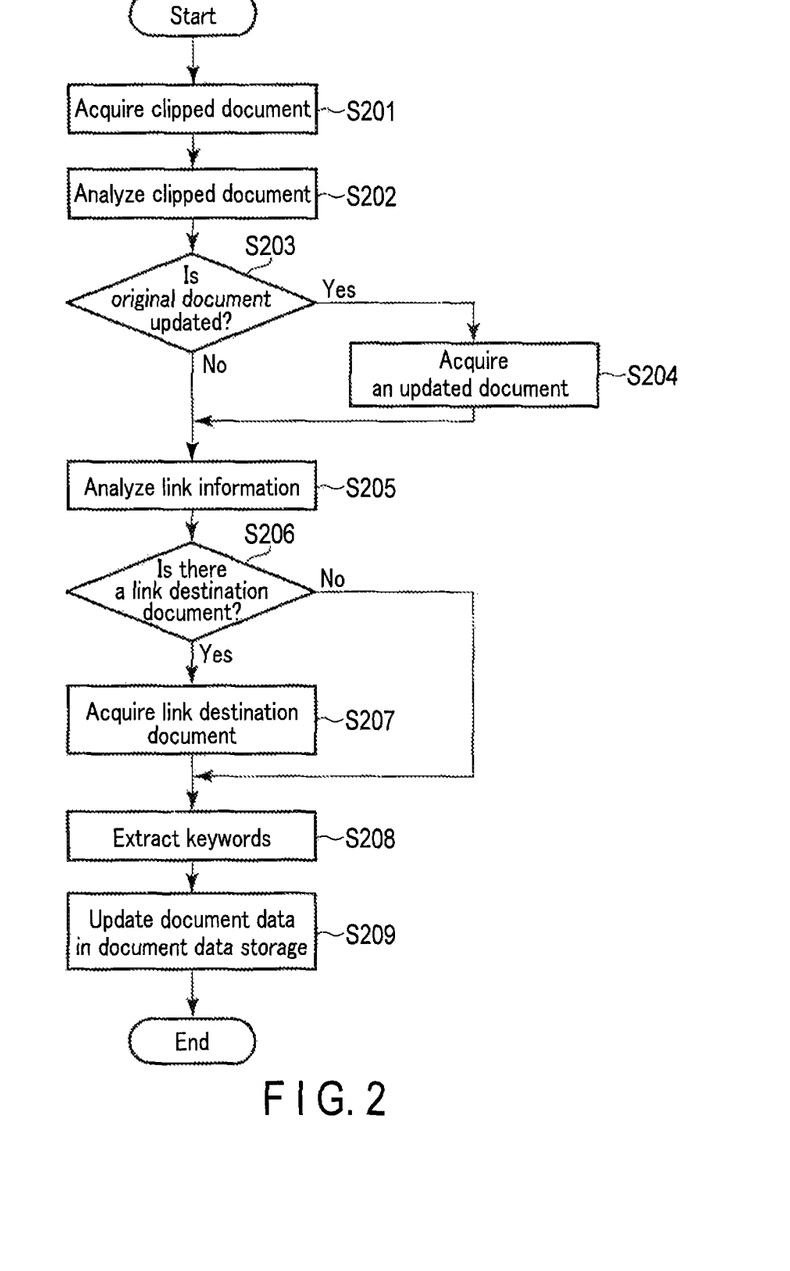
FIG. 2 is a flowchart showing a process of updating document data.

Next, the process of updating document data of clipped documents stored in the document data storage 101 will be explained with reference to the flowchart shown in FIG. 2.

Note that, in the present embodiment, a case where unprocessed clipped documents are stored in advance in the document data storage 101 is assumed; however, a clipped document may be obtained by the clipped document analyzer 102 when the clipped document is generated but not yet stored in the document data storage 101, and the clipped document may be processed at the subsequent stages.

In step S201, the clipped document analyzer 102 acquires a clipped document from the document data storage 101.

In step S202, the clipped document analyzer 102 analyzes the clipped document to acquire location information of the original document.

In step S203, the clipped document analyzer 102 determines whether the original document has been updated or not. It can be determined that the original document is updated if there is a difference in sentences or the like between the clipped document stored in the clipped document analyzer 102 and the original document that exists at the location indicated by the location information. If the original document has been updated, the process proceeds to step S204; if not updated, the process proceeds to step S205.

In step S204, the updated document acquirer 103 acquires an updated document. In a case where the original document has already been updated several times when determining the update status, more than one updated document can be obtained.

In step S205, the link information analyzer 104 analyzes the link information of the clipped document and the updated document.

In step S206, the link information analyzer 104 determines if there is a link destination document at a destination of the link information. If there is a link destination document, the process proceeds to step S207; if not, the process proceeds to step S208.

In step S207, the link-destination document acquirer 105 acquires the link destination document.

In step S208, the keyword extractor 107 extracts keywords from the clipped document, the updated document, and the link destination document.

In step S209, the attribution updating unit 108 updates document data of the clipped document stored in the document data storage 101. By the above, the process of updating document data of the clipped document is ended.

Next, an example of document data stored in the document data storage 101 will be explained with reference to FIG. 3.

Figure 3:
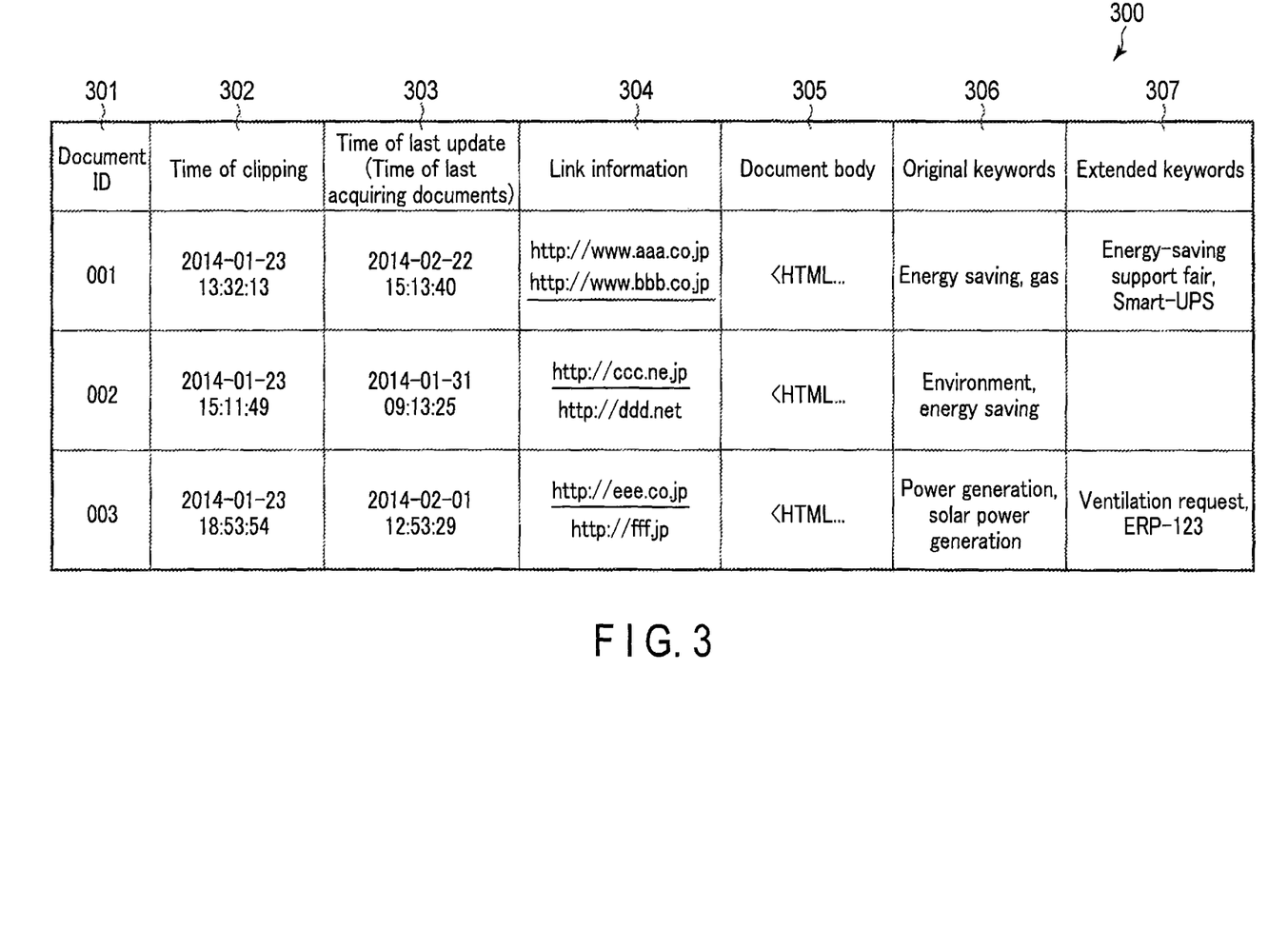
FIG. 3 shows an example of document data stored in a document data storage.

FIG. 3 shows the table 300 stored in the document data storage 101. The table 300 includes a document ID 301, a time of clipping 302, a time of last updating 303, link information 304, document body 305, original keywords 306, and extended keywords 307.

The document ID 301 is an identifier for identifying a document. The time of clipping 302 is a time when a clipping process is performed on an original document. The time of last updating 303 is a time when an original document is updated the last time, if the original document has been updated. If there is no update of the original document, the value that is the same as the time of clipping may be set as the time of last update 303. The time of last clipping 303 may be left blank.

The link information 304 is an address, such as an URL indicating a location of the link destination document.

The document body 305 is data body of each of the clipped document, the updated document, and the link destination document, and the document body 305 may be in Hypertext Markup Language (HTML) format, for example. If the clipped document is a partial area of the entire clipped document, the data of the entire clipped document is also preserved.

The original keywords 306 are keywords extracted from a clipped document. If the clipped document is a partial area of the entire clipped document, keywords may be extracted from the entire clipped document.

The extended keywords 307 are keywords acquired from the updated document and the link destination document.

In the example shown in FIG. 3, the document ID 301 "001" is associated with: "2014-01-23 13:32:13" as the time of clipping 302; "2014-02-22 15:13:40" as the time of last updating 303; "http://www . . . " as the link information 304;

"<HTML . . . " as the document body 305; "Energy-saving, gas" as the original keywords 306; and "Energy-saving support fair, Smart-UPS" as the extended keywords 307.

Figure 4:
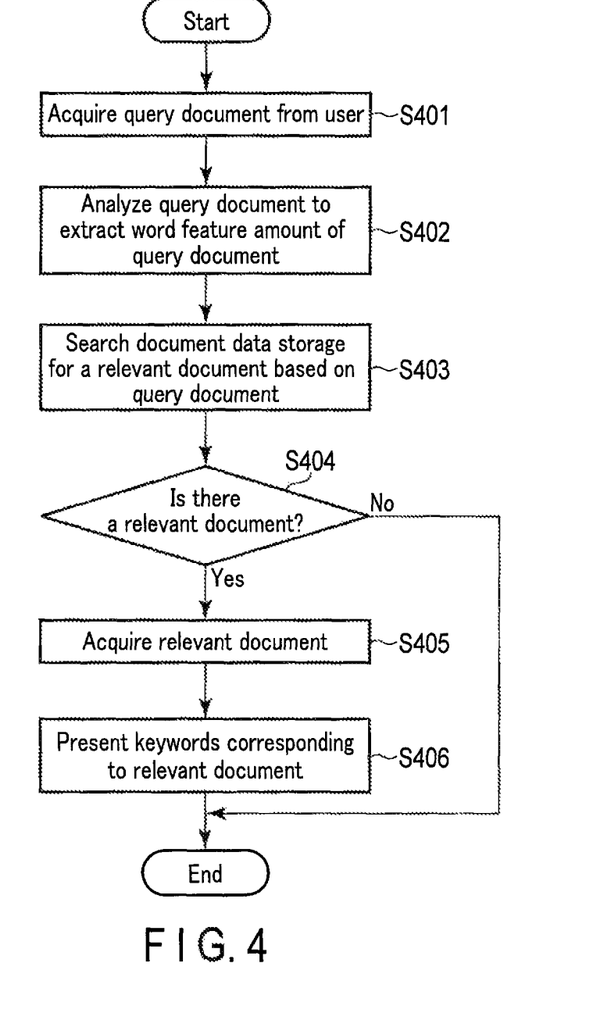
FIG. 4 is a flowchart showing a relevant document presentation process.

Next, the relevant document presentation process will be explained with reference to the flowchart of FIG. 4.

In step S401, the query document analyzer 109 acquires a query document.

In step S402, the query document analyzer 109 analyzes the query document to extract a word feature amount of the query document.

In step S403, the relevant document search unit 110 searches the document data storage 101 for a relevant document based on the query document.

In step S404, the relevant document search unit 110 determines whether or not there is a relevant document presents. If there is a relevant document, the process proceeds to step S405; if not, the process is ended.

In step S405, the relevant document search unit 110 acquires the relevant document, and the updated document, the link destination document, and the keywords (including the original keywords and extended keywords) associated with the relevant document.

In step S406, the presentation unit 111 presents the query document, the relevant document, the updated document, the link destination document, and the keywords associated with each of those documents. The relevant document presentation process is completed by the above process.

Figure 5:
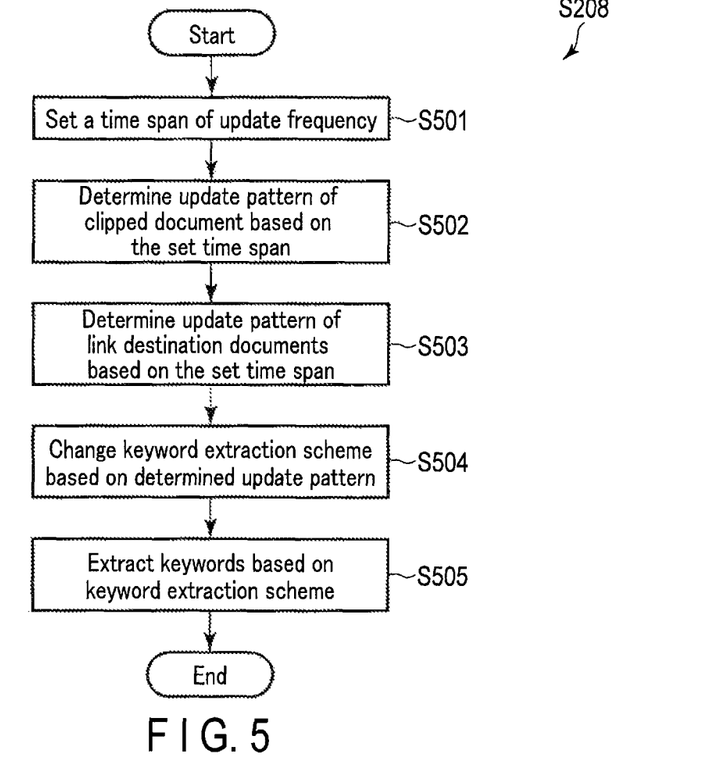
FIG. 5 is a flowchart showing a keyword extraction process of a keyword extractor.

Next, a keyword extraction process at the keyword extractor 107 will be explained with reference to the flowchart of FIG. 5.

In step S501, a time span of update frequency is set. The time span of update frequency indicates at what time interval the updating is performed, and herein, a predetermined value, such as "3 days" and "5 hours", is assumed. A time span of update frequency does not always have to be a predetermined value; a time span may be dynamically set, depending on the update frequency status of the original documents corresponding to a group of clipped documents collected by a user.

In step S502, an update pattern of the original document is determined based on the time span of update frequency. The update pattern is a pattern for classifying clipped documents in accordance with the frequency and pattern of update. For example, in a case where the time span of update frequency is set at 3 hours, if the original document is updated more than four times in 3 hours, then, the original document is classified as a frequently updated document. If the original document is updated more than once and less than four times, the original document is classified as a periodically-updated document. If the original document is not updated even once, the document is classified as a static document. It is noted that the updated pattern does not have to be a fixed pattern. Clipped documents may be grouped as appropriate in accordance with the update status, and may be dynamically clustered in accordance with a characteristic of each of the groups of clipped documents.

In step S503, an update pattern is determined for the link destination document based on the time span of update frequency. An update pattern for the link destination document can be determined using the same method as that used at step S502.

In step S504, weighting is performed on keyword extraction schemes in accordance with the determined update pattern to change a keyword extraction scheme. Herein, the change of a keyword extraction scheme by weighting includes the change of a keyword extraction algorithm itself for the same keyword extraction scheme, in addition to the change of parameters for weighting. A specific example of weighting is to determine which keywords should be extracted from domains of fields and logical elements that are related to layout of the updated document and layout of the link destination document.

In step S505, keywords are extracted based on a keyword extraction scheme. The keyword extraction process is completed.

Next, an example of the relationship between an update pattern and a keyword extraction scheme will be explained with reference to FIG. 6.

Figure 6:
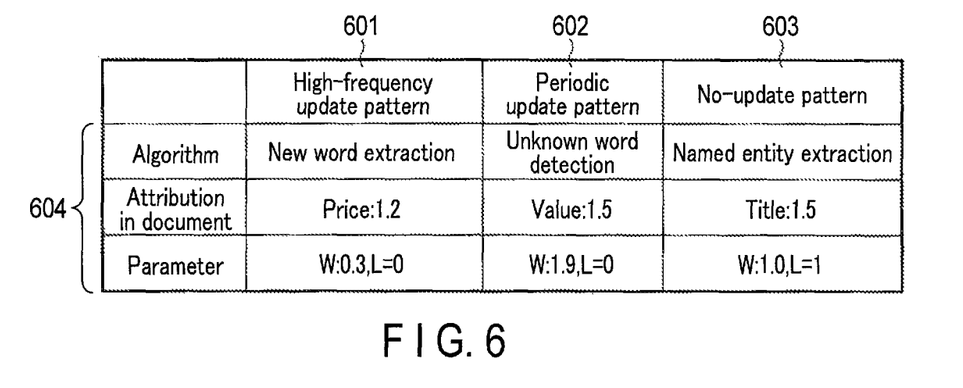
FIG. 6 shows an example of a relationship between an update pattern and a keyword extraction scheme.

In the table 600 shown in FIG. 6, a high-frequency update pattern 601, a periodic update pattern 602, and a no-update pattern 603 are the update patterns, and for each of the patterns, a weight for a keyword extraction scheme is set for each category 604.

In the table 600, the category 604 includes an algorithm, an attribution, and a parameter; however, other elements may be included as the category.

For example, for an algorithm, an unknown word extraction method is adopted for the periodic update pattern 602. A unique expression extraction method is adopted for the no-update pattern 603. A new word extraction method is adopted for a page with a high frequency of updating, like the high-frequency update pattern 601, in order to actively obtain newly-occurred keywords.

Regarding an attribution in a document, a keyword to which the attribution of "value" is given in the periodic update pattern 602 is weighted 1.5 times. In the no-update pattern 603, because the document is not updated, its title is highly likely to be important; thus, a keyword to which the attribution of "title" is given is weighted 1.5 times. In the high-frequency update pattern 601, it is expected that a price, for example, will be frequently updated; thus, a keyword to which the attribution of "price" is given is weighted 1.2 times.

If the parameter "W", which is a weight for a word, and the parameter "L", which is an appearance position of the word, are variable, these parameters are weighted differently.

Figure 7:
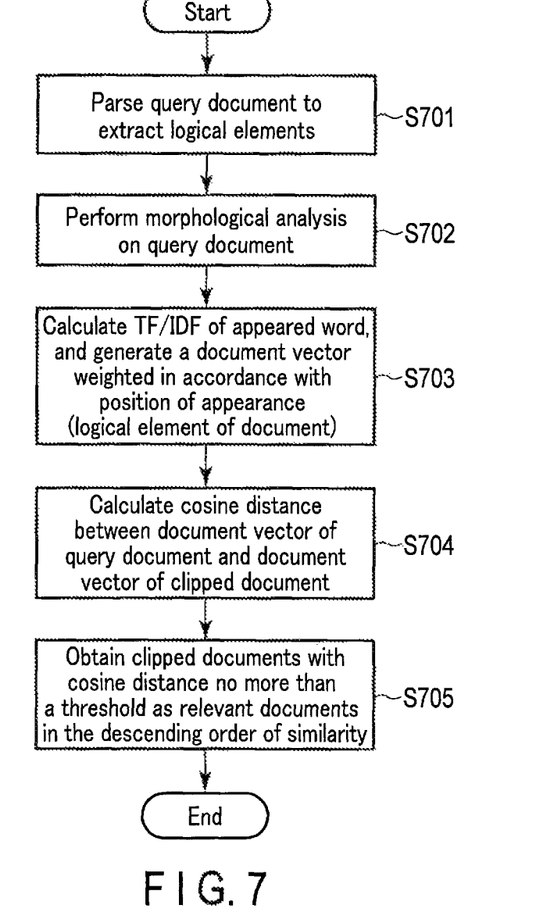
FIG. 7 is a flowchart showing a relevant document determination process at a relevant document search unit.

Next, the relevant document determination process at the relevant document search unit 110 will be explained with reference to FIG. 7.

In step S701, a logical element is extracted by parsing the query document. Specifically, it is detected what kind of character strings and phrases are included in what component and attribution, and a detection result may be extracted as a logical element.

In step S702, a morphological analysis is performed on the query document to extract keywords. A keyword may be a character string consisting of a morphological analysis result, nouns and a noun conjunctive range, and a combination (conjugation) of an unknown word and a noun, etc., or may be a character string obtained from a result of detecting an appropriate conjunctive range using C-Value, etc. based on statistical information of the appearance of those elements.

In step S703, a Term Frequency-Inverse Document Frequency (TF/IDF) value of a clipped document stored in a document data storage 101 is calculated for the words and phrases which are extracted as keywords. Furthermore, a document vector for each of the query document and the clipped document is generated in which a weight is differentiated in accordance with a logical element (position of appearance).

In step S704, a cosine distance between the document vector of the query document and the document vector of the clipped document stored in the document data storage 101 is calculated.

In step S705, a clipped document with a cosine distance which is no more than a threshold, in other words, a similarity level which is no less than a threshold is determined to be a relevant document similar to the query document, and the clipped documents having a document vector at a high similarity level are obtained as relevant documents in the descending order of the similarity level. The relevant document searching process is completed by the above process.

Next, an example of presentation of a relevant document and keywords at the presentation unit 111 will be explained with reference to FIG. 8.

Figure 8:
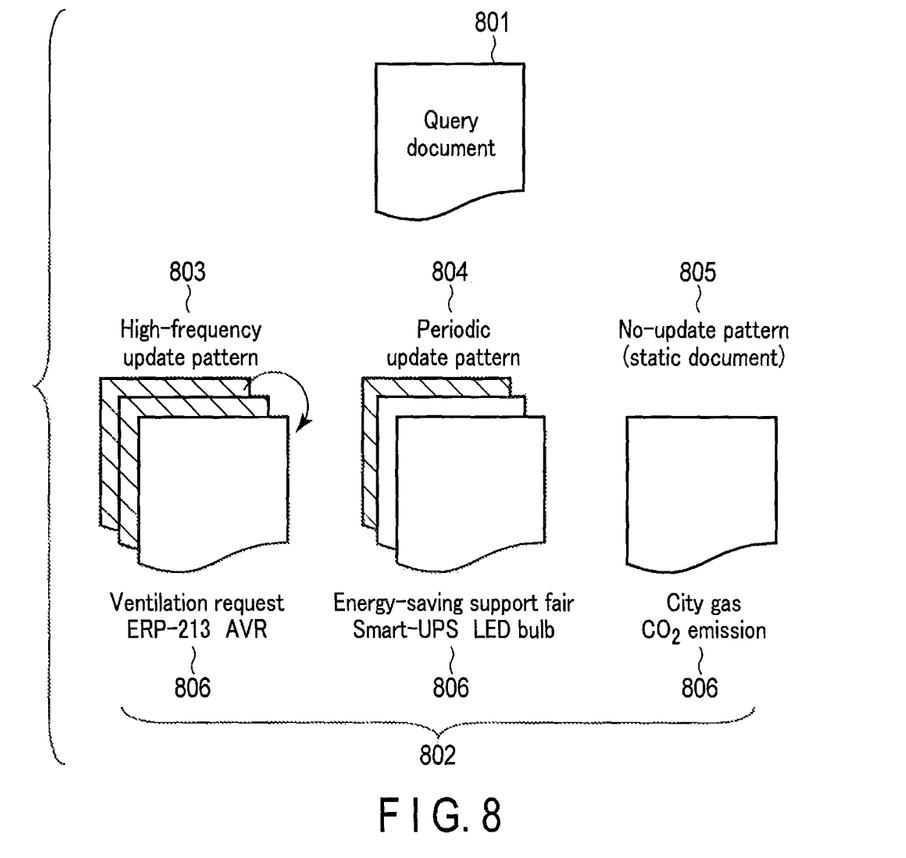
FIG. 8 shows an example of presentation of a relevant document and keywords in a presentation unit.

In the example shown in FIG. 8, the presentation unit 111 presents the query document 801 along with the relevant document 802. In the relevant document 802, the updated document and the link destination document, as well as the clipped documents, are presented aligned in a depth direction. The relevant document 802 is classified into one of the categories, the high frequency update 803, the periodic update 804, and the no-update 805, and the keywords 806 detected in each of the categories are also presented.

The keywords 806 may be presented in different fonts and colors to distinguish from each other the keywords obtained from the clipped documents, the keywords obtained from the updated documents, and the extended keywords obtained from the link destination documents.

According to the embodiment described above, not only a clipped document, but also an updated document and a link destination document related to the clipped document can be obtained, and keywords in these documents can be extracted using a keyword extracting method suited for an update frequency, thereby presenting keywords matching a user's intention and interest. By extracting keywords from an updated document and a link destination document, keywords can be obtained from different perspectives, in addition to a one-dimensional perspective which is based on a similarity between clipped documents. Thus, it is possible to widen the range of a user's interest and the search range by presenting keywords relevant to documents that are not viewed by a user.

The flow charts of the embodiments illustrate methods and systems according to the embodiments. It is to be understood that the embodiments described herein can be implemented by hardware, circuit, software, firmware, middleware, microcode, or any combination thereof. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

What is claimed is:

1. A search support apparatus for widening a range of a user's interest, the apparatus comprising:
   a hardware processor configured to:
      analyze a clipped document to obtain location information indicating a location of an original document which is an origination from which the clipped document is obtained;
      acquire an updated document by referring to the location information if the original document has been updated, the updated document being the updated original document;
      measure a first update frequency of the original document;
      extract one or more first keywords from the clipped document;
      weight each keyword extraction algorithm from a plurality of keyword extraction algorithms based at least in part on an update pattern corresponding to a time span of the first update frequency among a high-frequency update pattern, a periodic update pattern, and a no-update pattern;
      select a keyword extraction algorithm from the plurality of keyword extractions algorithms based on the weight of each keyword extraction algorithm, wherein the keyword extraction algorithm extracts at least one different keyword from the updated document than at least one other keyword extraction algorithm from the plurality of keyword extraction algorithms;
      extract one or more second keywords from the updated document using a first keyword extraction scheme which is set in accordance with the first update frequency, the first keyword extraction scheme including the keyword extraction algorithm; and
   a storage which stores the one or more first keywords, the one or more second keywords and the update document each associated with the clipped document.

2. The apparatus according to claim 1,
   wherein the hardware processor is further configured to:
      extract a word feature amount of a query document which serves as a search query; and
      search the storage for a relevant document which is a clipped document having a level of similarity with the word feature amount no less than a threshold; and
   wherein the apparatus further comprises a display configured to display the query document, the relevant document, and at least one of an updated document associated with the relevant document and the one or more second keywords associated with the relevant document.

3. The apparatus according to claim 1, wherein the hardware processor is further configured to:

analyze the clipped document and the updated document to obtain link information indicating a link to other documents;

acquire a link destination document by referring to the link information, the link destination document being a linked-to document;

measure a second update frequency of the link destination document; and extract one or more third keywords from the link destination document, using a second keyword extraction scheme in accordance with the second update frequency, the second keyword extraction scheme including a keyword extraction algorithm selected from the plurality of keyword extraction algorithms based on an update pattern corresponding to a time span of the second update frequency among the high-frequency update pattern, the periodic update pattern, and the no-update pattern; and wherein the storage further stores the link destination document and the one or more third keywords each associated with the clipped document.

4. The apparatus according to claim 3, wherein the hardware processor extracts the one or more third keywords from domains of logical elements and fields related to a layout of the updated document set in accordance with the second update frequency.

5. The apparatus according to claim 1,
wherein the hardware processor is further configured to:
extract a word feature amount of a query document which serves as a search query; and
search the storage for a relevant document which is a clipped document having a level of similarity with the word feature amount no less than a threshold; and
wherein the apparatus further comprises a display configured to display the query document, the relevant document, and at least one of an updated document associated with the relevant document, a link destination document associated with the relevant document, the one or more second keywords associated with the relevant document and the one or more third keywords associated with the relevant document.

6. The apparatus according to claim 1, wherein the hardware processor extracts the one or more second keywords from domains of logical elements and fields related to a layout of the updated document set in accordance with the first update frequency.

7. A search support method for widening a range of a user's interest, the method comprising:
analyzing a clipped document to obtain location information indicating a location of an original document which is an origination from which the clipped document is obtained;
acquiring an updated document by referring to the location information if the original document has been updated, the updated document being the updated original document;
measuring a first update frequency of the original document;
extracting one or more first keywords from the clipped document;
weighting each keyword extraction algorithm from a plurality of keyword extraction algorithms based at least in part on an update pattern corresponding to a time span of the first update frequency among a high-frequency update pattern, a periodic update pattern, and a no-update pattern;

selecting a keyword extraction algorithm from the plurality of keyword extractions algorithms based on the weight of each keyword extraction algorithm, wherein the keyword extraction algorithm extracts at least one different keyword from the updated document than at least one other keyword extraction algorithm from the plurality of keyword extraction algorithms;

extracting one or more second keywords from the updated document using a first keyword extraction scheme which is set in accordance with the first update frequency, the first keyword extraction scheme including the keyword extraction algorithm; and storing, in a storage, the one or more first keywords, the one or more second keywords and the update document each associated with the clipped document.

8. The method according to claim 7, further comprising:
extracting a word feature amount of a query document which serves as a search query;
searching the storage for a relevant document which is a clipped document having a level of similarity with the word feature amount no less than a threshold; and
presenting the query document, the relevant document, and at least one of an updated document associated with the relevant document and the one or more second keywords associated with the relevant document.

9. The method according to claim 7, further comprising:
analyzing the clipped document and the updated document to obtain link information indicating a link to other documents;
acquiring a link destination document by referring to the link information, the link destination document being a linked-to document;
measuring a second update frequency of the link destination document;
extracting one or more third keywords from the link destination document, using a second keyword extraction scheme in accordance with the second update frequency, the second keyword extraction scheme including a keyword extraction algorithm selected from the plurality of keyword extraction algorithms based on an update pattern corresponding to a time span of the second update frequency among the high-frequency update pattern, the periodic update pattern, and the no-update pattern; and
storing, in the storage, the link destination document and the one or more third keywords each associated with the clipped document.

10. The method according to claim 9, wherein the extracting extracts the one or more third keywords from domains of logical elements and fields related to a layout of the updated document set in accordance with the second update frequency.

11. The method according to claim 7, further comprising:
extracting a word feature amount of a query document which serves as a search query;
searching the storage for a relevant document which is a clipped document having a level of similarity with the word feature amount no less than a threshold; and
presenting the query document, the relevant document, and at least one of an updated document associated with the relevant document, a link destination document associated with the relevant document, the one or more second keywords associated with the relevant document and the one or more third keywords associated with the relevant document.

12. The method according to claim 7, wherein the extracting extracts the one or more second keywords from domains of logical elements and fields related to a layout of the updated document set in accordance with the first update frequency.

13. A non-transitory computer readable medium including computer executable instructions, wherein the instructions, when executed by a processor, cause the processor to perform a method for widening a range of a user's interest, the method comprising:

analyzing a clipped document to obtain location information indicating a location of an original document which is an origination from which the clipped document is obtained;

acquiring an updated document by referring to the location information if the original document has been updated, the updated document being the updated original document;

measuring a first update frequency of the original document;

extracting one or more first keywords from the clipped document;

weighting each keyword extraction algorithm from a plurality of keyword extraction algorithms based at least in part on an update pattern corresponding to a time span of the first update frequency among a high-frequency update pattern, a periodic update pattern, and a no-update pattern;

selecting a keyword extraction algorithm from the plurality of keyword extractions algorithms based on the weight of each keyword extraction algorithm, wherein the keyword extraction algorithm extracts at least one different keyword from the updated document than at least one other keyword extraction algorithm from the plurality of keyword extraction algorithms;

extracting one or more second keywords from the updated document using a first keyword extraction scheme which is set in accordance with the first update frequency, the first keyword extraction scheme including the keyword extraction algorithm; and storing, in a storage, the one or more first keywords, the one or more second keywords and the update document each associated with the clipped document.

14. The medium according to claim 13, further comprising:

extracting a word feature amount of a query document which serves as a search query;

searching the storage for a relevant document which is a clipped document having a level of similarity with the word feature amount no less than a threshold; and presenting the query document, the relevant document, and at least one of an updated document associated with the relevant document and the one or more second keywords associated with the relevant document.

15. The medium according to claim 13, further comprising:

analyzing the clipped document and the updated document to obtain link information indicating a link to other documents;

acquiring a link destination document by referring to the link information, the link destination document being a linked-to document;

measuring a second update frequency of the link destination document;

extracting one or more third keywords from the link destination document, using a second keyword extraction scheme in accordance with the second update frequency, the second keyword extraction scheme including a keyword extraction algorithm selected from the plurality of keyword extraction algorithms based on an update pattern corresponding to a time span of the second update frequency among the high-frequency update pattern, the periodic update pattern, and the no-update pattern; and storing, in the storage, the link destination document and the one or more third keywords each associated with the clipped document.

16. The medium according to claim 15, wherein the extracting extracts the one or more third keywords from domains of logical elements and fields related to a layout of the updated document set in accordance with the second update frequency.

17. The medium according to claim 13, further comprising:

extracting a word feature amount of a query document which serves as a search query;

searching the storage for a relevant document which is a clipped document having a level of similarity with the word feature amount no less than a threshold; and presenting the query document, the relevant document, and at least one of an updated document associated with the relevant document, a link destination document associated with the relevant document, the one or more second keywords associated with the relevant document and the one or more third keywords associated with the relevant document.

18. The medium according to claim 13, wherein the extracting extracts the one or more second keywords from domains of logical elements and fields related to a layout of the updated document set in accordance with the first update frequency.

* * * * *